United States Patent [19]

Fletcher

[11] Patent Number: 5,098,760
[45] Date of Patent: Mar. 24, 1992

[54] BEVELED GLASS PANEL AND METHOD OF MAKING

[75] Inventor: Robert K. Fletcher, El Toro, Calif.

[73] Assignee: Stained Glass Overlay, Inc., Orange, Calif.

[21] Appl. No.: 631,913

[22] Filed: Dec. 21, 1990

[51] Int. Cl.$^5$ .................................................. B44F 1/06
[52] U.S. Cl. ...................................... 428/46; 428/49; 428/38; 156/63; 156/221; 156/273.3
[58] Field of Search ............... 428/46, 38, 49; 52/314, 52/311; 156/63, 221, 273.3

[56] References Cited

U.S. PATENT DOCUMENTS

| 3,420,730 | 1/1969 | Ellefson | 428/38 |
| 4,154,880 | 5/1979 | Drennan | 428/38 |
| 4,495,739 | 1/1985 | Drennan | 52/308 |
| 4,904,513 | 2/1990 | Nicolo | 428/38 |

*Primary Examiner*—Alexander S. Thomas
*Attorney, Agent, or Firm*—Henry M. Bissell

[57] ABSTRACT

A simulated leaded glass panel incorporates a glass backing sheet on which are mounted glass pieces having thin beveled edges and positioned in a desired pattern. The beveled pieces are affixed to the glass by liquid adhesive which may be activated by the application of ultraviolet light. Adhesive-backed lead strips are positioned to outline the beveled pieces and are correspondingly placed on the underside of the glass sheet to achieve the desired effect of leaded glass. Textured film pieces may be placed adjacent the beveled pieces to achieve a desired frosted glass effect.

17 Claims, 2 Drawing Sheets

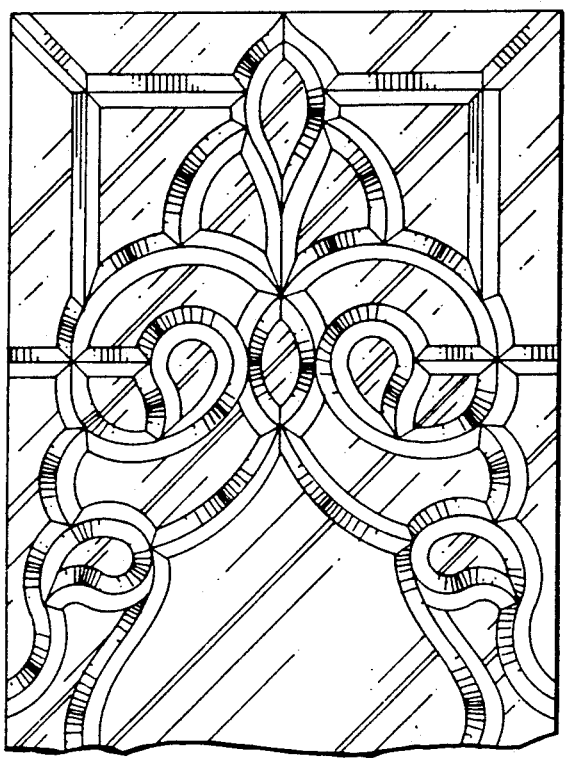
FIG. 1
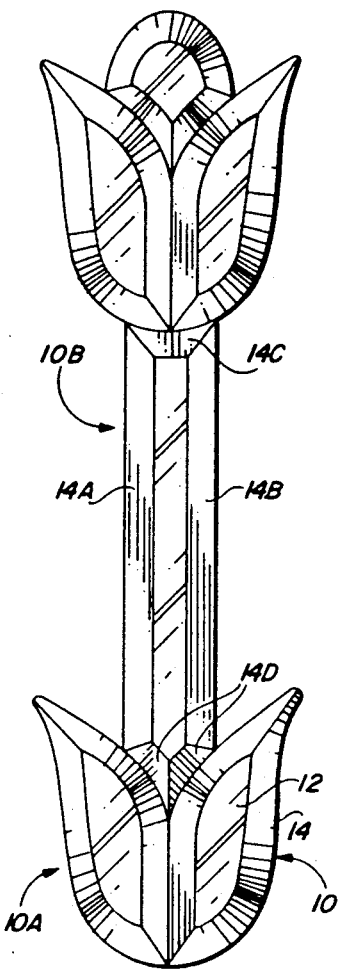
FIG. 2
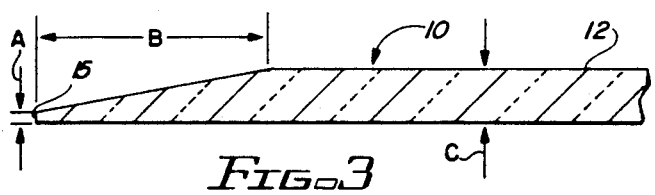
FIG. 3
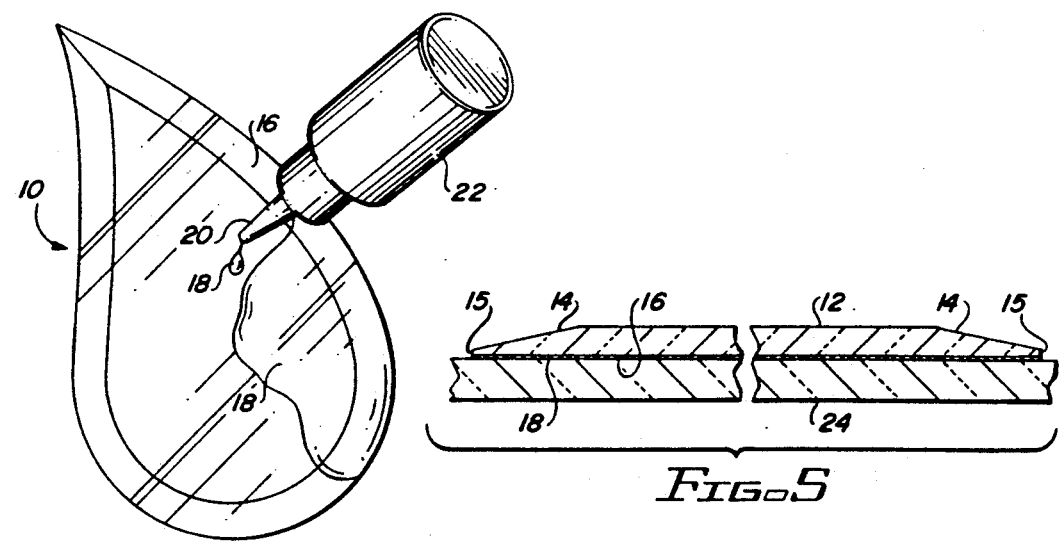
FIG. 4
FIG. 5

BEVELED GLASS PANEL AND METHOD OF MAKING

BACKGROUND OF THE INVENTION

1. Field of the Invention

This invention relates to decorative glass panels which may be used for windows and the like and, more particularly, to such panels which are formed with beveled laminated pieces to simulate leaded glass windows.

2. Description of the Related Art

Leaded glass windows wherein pieces of glass are fitted together and supported by a lead came or molding that has channels to contain the marginal edges of the fitted pieces are common. They have been long known and used, and are currently in vogue. However, they present certain drawbacks. They require fabrication by skilled artisans which makes them rather costly. Any settling of the panel or its mounting framework with time tends to shift the pieces, sometimes creating gaps which render the window unsightly and permitting rain and wind to penetrate the window. Even properly formed leaded windows are often not sufficiently weather-tight to permit such windows to be used under all circumstances, particularly where a leaded window is desired to be used as one panel of a multipanel insulated window.

There have been suggestions for simulating leaded glass windows incorporating a single piece of glass as the basic window with various types of overlays and simulated came. U.S. Pat. No. 3,420,730 of Ellefson discloses a window pane with thin decorative overlays secured at their marginal edges to the window with tape. This is a simulated stained glass window with an overlay of about 0.001" and a metallic lead tape with a thickness of about 0.022". This is not a satisfactory simulation of a leaded glass window because the aesthetic effect is deficient.

U.S. Pat. No. 4,154,880 of Drennan discloses a came of special construction which can be applied to a window which has a flat surface. However, the aesthetic effect of this simulated leaded glass window is deficient, since it merely includes strips of came adhered to a flat glass surface.

U.S. Pat. No. 4,495,739 of Drennan addresses the deficiency noted above with respect to the '880 patent in that it uses beveled glass pieces placed over a single flat pane and held in position by an encircling bead of adhesive and came outlining. However, this requires a specially configured simulated came having one surface angled to adhere to the flat glass pane and another surface angled to adhere to the beveled edge of the added piece. In one embodiment disclosed in this patent, special inserts are required to provide the build-up needed to accommodate the thickness of the beveled edges of the additional pieces. This embodiment, shown in cross section in FIG. 4 of the '739 patent is somewhat similar to a technique which has been employed involving narrow lead strips placed about the terminal edges of the beveled pieces so that conventional cover strips of lead can be used over the narrow buildup strips with improved aesthetic effect and adherence effectiveness.

SUMMARY OF THE INVENTION

In brief, particular arrangements in accordance with the present invention incorporate one or more pieces of beveled glass laminated to a flat glass sheet and outlined by particularly shaped, backed, lead alloy stripping. Typically, these pieces are shaped and joined in groups to form center clusters, crests, frames, accent pieces, corners and the like to develop almost any desired pattern. These are particularly popular in windows and shower enclosures and can be used in many other panels to provide customs accents throughout the home. For example, these find utilization in skylights, front door side lights, mirrors, sliding doors, cabinet and furniture doors, room dividers and the like.

The beveled pieces utilized in the embodiments of the present invention are referred to as "bevels". They are pieces of glass which have been cut to a selected outline shape and ground to a predetermined bevel terminating in an edge thickness of 2.0 millimeters or less. The thickness of the glass pieces prior to grinding is generally either 5 or 6.35 millimeters (3/16" or ¼" nominal) plus or minus 10%.

The bevels used heretofore have had an edge thickness of a standard ⅛". These have been too thick for the fabrication techniques employed in the present invention. Application of the standard lead strip, typically ¼" thick with one flat side, without the support of a special build-up strip has resulted in poor aesthetic effects because of the canted or tilted appearance of the lead strips and inadequate adherence because of the limited portion of the flat backing surface making contact with the glass.

In the preferred fabrication technique in accordance with the present invention, the bevels which are shaped according to a selected pattern of a simulated leaded glass panel are coated along their back surfaces with a liquid adhesive which is ultraviolet sensitive. These are then placed in desired positions on a flat glass sheet which is to serve as the backing and support panel. Force is applied to the bevels while they are moved slightly back and forth along the surface of the glass sheet in order to "squeegee" any bubbles out from under the bevels. When the bevels are properly located in place, the adhesive is activated by the application of ultraviolet light. This can be accomplished by using a UV lamp for about 15 seconds or the panel can be placed outdoors in sunlight.

Adhesive-backed lead strips are then applied about the peripheral edges of the bevels and overlapping therewith approximately 50% of the width of the strip so that the other half of the strip either contacts the surface of the backing glass sheet or overlaps the edge of an adjacent bevel. After the strips are properly positioned, a burnishing tool in the form of a Teflon or Delron peg is applied along the lead strips to bone them down in place, thereby firmly setting the adhesive backing of the lead strips onto the glass. Matching lead strips are placed on the back of the glass backing sheet and boned down against the glass to complete the effect of a simulated glass panel.

The liquid adhesive which is used to adhere the bevels on the glass panel is a clear transparent adhesive which sets clear when activated by ultraviolet light. A preferable adhesive for this use is one marketed by Lumin Essence of Sparta, Michigan under the Sunset trademark.

The lead strips are preferably formed of a lead alloy containing 98% pure lead with the remainder of the alloy being copper and antimony which are added to provide the desired stiffness and formability.

In some of the panels, it is desired to incorporate a thin textured film on certain areas of the glass backing panel between or surrounding some of the bevels to achieve certain desired effects, such as frosting to eliminate transparency and for contrast. Colored films may also be incorporated. The textured films are formed by an embossing step during the film fabrication process. Where films are to be incorporated, they are placed in position after the UV activation of the beveled adhesive and before the lead strips are placed in position. The films have a pressure-sensitive adhesive along their backing surface covered by a release liner which is removed when the film is placed in position on the glass. The film may be cut to an approximate shape by scissors, a razor blade or a knife. After the film is finally placed and adhered to the glass backing sheet, a final trim may be accomplished by a razor blade or a knife. Any excess may be removed from the adjacent bevels, after final trim, or it may be covered by the lead strips which are placed over the edges of the bevels thereafter.

The bevels are cut to the desired shapes by using a handheld glass cutter. The curved shapes are then ground to the specified beveled shape and edge thickness by hand on a grinding wheel, using water and a grinding compound. The straight edge pieces are beveled in long lengths, then cut to the selected lengths for individual pieces and the cut ends are thereafter beveled by hand.

The bevels which are used in the disclosed arrangements in accordance with the present invention have a bevel width of approximately ⅛". The edge thickness is not in excess of 2.0 millimeters and is nominally approximately 1/16" thick at the edge.

DESCRIPTION OF THE DRAWING

A better understanding of the present invention may be realized from a consideration of the following detailed description, taken in conjunction with the accompanying drawing, in which:

FIG. 1 is a view of a window panel in accordance with the present invention;

FIG. 2 shows one of the many design combinations which may be incorporated in panels in accordance with the present invention;

FIG. 3 is a cross-sectional view of one of the bevels of the present invention;

FIG. 4 is a schematic diagram illustrating a step in the preparation of arrangements in accordance with the present invention;

FIG. 5 is a schematic view of one of the bevels being adhered in place on the supporting glass panel of the present invention;

DETAILED DESCRIPTION OF THE PREFERRED EMBODIMENTS

Figure 6:
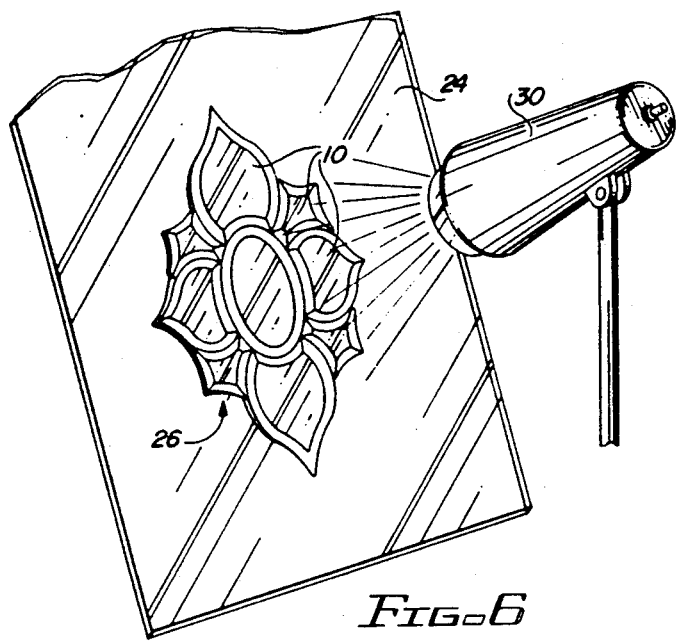
FIG. 6 is a schematic diagram showing a further step in the fabrication of arrangements in accordance with the invention.

FIG. 1 is a sketch taken from a photograph of a simulated leaded glass window in accordance with the present invention. In FIG. 1, a plurality of bevels are shown arranged in a selected composite design and mounted on a backing support sheet of glass. The glass sheet is not visible, being covered by the bevel design so as to produce the effect of a leaded glass window.

FIG. 2 shows a plurality of bevels 10 arranged in an integral design which can be used either alone when it is a single cluster of bevels mounted on a support sheet of glass or in combination with other designs when mounted on a glass backing sheet.

Each of the bevels 10 in FIG. 2 is shown as having a central "island" portion surrounded by two or more beveled portions which extend from the central portion to the outer periphery of the piece. The irregularly shaped pieces such as 10A, which are generally defined by intersecting curved lines, are formed by cutting by hand with a hand-held glass cutter to define the outline of the piece and thereafter grinding the beveled portions 14 by holding the piece and using manual grinding equipment. Regularly shaped pieces, such as 10B, can be cut in long pieces and then ground at the beveled longitudinal edges by placing the piece in a jig which moves it against a grinder to form the longitudinal bevel portions 14A and 14B. Thereafter, the straight-sided piece 10B is formed by cutting the long piece to a desired length and then grinding the bevels 14C and 14D by hand in the same manner as the beveled portions 14 on the pieces 10A are formed.

The profile of a bevel can be seen in the sectional view of FIG. 3. The bevel 10 is generally cut from a piece of 5 millimeter thick glass having a nominal thickness of 3/16". ¼" glass with a thickness of 6.35 millimeters may also be used. This thickness is maintained in the central portion 12 as indicated by the dimension C. The extent of the bevel portion 14 (the bevel width) is maintained at ⅛", corresponding to the dimension B in FIG. 3. The edge thickness, designated by the dimension A at the edge 15, is nominally 1/16". This may vary slightly to a maximum thickness of 2.0 millimeters. 1.6 millimeters is the preferred thickness.

After the bevels are formed in the manner described and selected for inclusion in a particular design, each individual bevel 10 is coated on its rear surface 16 with a layer of clear liquid adhesive 18. This coating step is indicated in FIG. 4 which shows the adhesive 18 being applied by an applicator 20 from a container 22. The liquid adhesive 18 is sensitive to ultraviolet radiation so that it can be cured and "set up" with an ultraviolet lamp.

The bevel 10 is first placed on a backing sheet of standard window glass 24 with the rear surface 16 facing the glass and the adhesive layer 18 against it, as indicated in FIG. 5. One or more bevels 10, each having its rear surface 16 coated with a layer of adhesive 18, is placed in position on the glass sheet 24 to form the selected design. The bevels 10 are then pushed against the glass sheet 24 and moved slightly from side to side to force any bubbles which may have formed in the adhesive out past the edges of the bevel.

Next the sheet of glass 24 with the bevels 10 positioned thereon to form the selected design is exposed to ultraviolet radiation, as indicated in FIG. 6 which shows a glass sheet 24 with a design 26 comprising bevels 10 exposed to an ultraviolet lamp 30. The interval of UV exposure is generally approximately 15 seconds. This may vary depending upon the particular liquid adhesive which is used and the intensity of the UV lamp. Alternatively, a simulated leaded glass panel 28, comprising the design 26 on the glass sheet 24, may be positioned in clear sunlight where the adhesive 18 sets up in a very short time.

Figure 7:
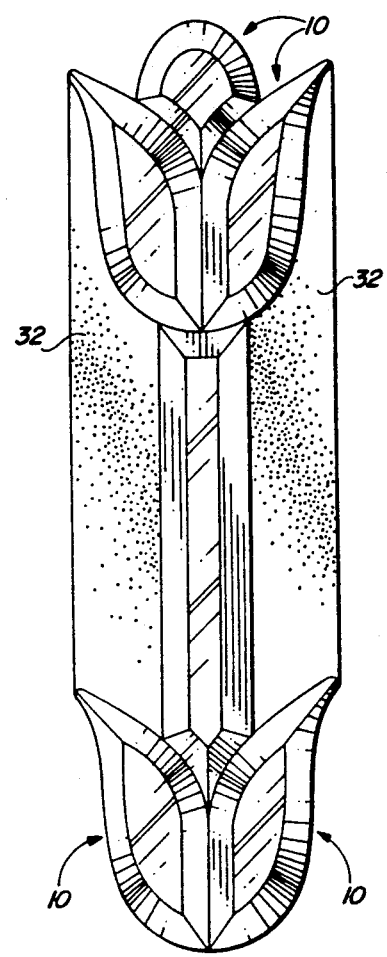
FIG. 7 is a view like FIG. 2 showing the addition of textured film to the design.

The next step is to apply a plurality of lead strips to the design 26 of FIG. 6. It is sometimes desirable to add one or more film pieces to the design, in which case these are mounted prior to the application of the lead strips. FIG. 7 shows a pair of textured film pieces 32 which have been added to the design which is shown in FIG. 2. The film pieces 32 are adhesive backed and provided with a removable protective layer. They are typically cut, as by scissors, to the approximate shape and size which are desired. Thereafter, the protective backing layer is removed and piece 32 is placed in position alongside the bevels 10 on the backing sheet 24. A final trimming of the piece 32 can be accomplished by means of a razor blade or knife. The numeral 32 may designate a textured film piece used to achieve a frosted effect in the final design. Texturing is accomplished by embossing the film during the fabrication process. The numeral 32 may alternatively designate a colored film piece, used to achieve a simulated stained glass effect.

Figure 8:
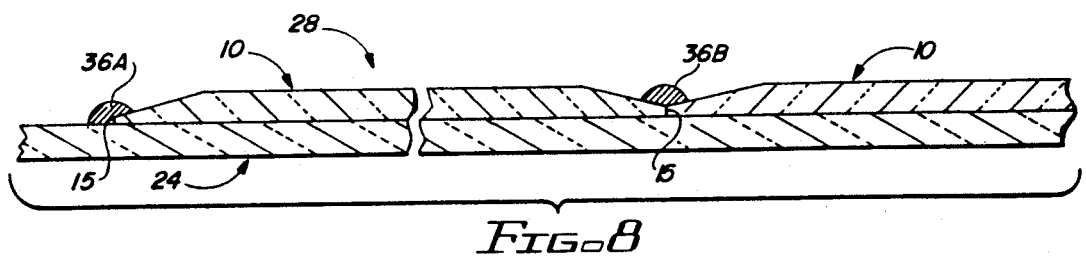
FIG. 8 is a sectional view showing bevels in place on a support sheet with a plurality of lead strips added along the edges of the bevels.

Finally, lead strips 36 are placed in position on the upper side of the panel 28, extending along each bevel edge 15 and generally outlining the bevels. In the cross sectional view of FIG. 8, the strip 36A is shown at the termination of a bevel 10, whereas the lead strip 36B is shown bridging the juncture of two bevels 10. These lead strips are about ¼" wide and ⅛" thick with a flat rear side which is adhesive backed, having a protective cover layer over the adhesive which is removed just prior to use. The lead strips 36 are burnished in their proper positions, using a boning peg or tool which firmly adheres the adhesive on the back of the strips 36 to the adjacent glass surfaces and tends to shape the contour of the lead strips to adjust to the shapes of the adjacent bevel 15.

Figure 9:
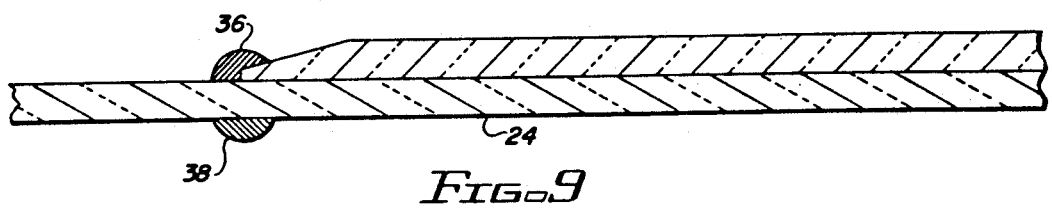
FIG. 9 is a sectional view showing lead strips covering the edge of a bevel and in a corresponding position on the underside of the supporting glass panel.

Subsequently, a corresponding plurality of lead strips 38 is positioned on the back side of the glass sheet 24, as indicated in FIG. 9, and burnished with the boning tool to complete the simulation of the leaded glass panel.

Through the practice of the present invention, improved simulated leaded glass panels are achieved which are more attractive in appearance and can be fabricated with a simpler process than have been practical heretofore. The need for providing additional pieces extending about the periphery of the glass bevels in order to match the increased edge thickness of those bevels is eliminated. All that is required is a conventional lead outline strip which can be burnished into position to fit the reduced edge thickness of the bevels of the present invention, thereby avoiding the canted appearance that resulted heretofore if no build up strips were used. The fabrication of simulated leaded glass panels in accordance with the present invention is thus simplified and can be performed both more quickly and more economically.

Panels constructed in accordance with the present invention provide an enhanced appearance wherever they are used, particularly in home decorating. The one-piece, seamless construction with the bevels adhered to a single continuous sheet of glass keeps water out and temperature controlled air in. The bevels may be applied directly to any flat glass surface, including safety glass, tempered glass and insulated glass.

Although there have been described hereinabove various specific arrangements of a beveled glass panel and method of making same in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A beveled glass panel simulating leaded glass comprising:
   a backing sheet of glass;
   a plurality of beveled glass members mounted thereon in positions to form a selected design,
   each member comprising a central island portion surrounded by two or more bevel portions each extending from the island portion at a nominal thickness in a range of 3/16" to ¼" to a peripheral edge having a thickness not in excess of 2 millimeters, the width of each bevel portion being approximately ½";
   a layer of clear, ultra-violet radiation-sensitive adhesive between said members and said backing sheet for adhering said members to said sheet; and
   a first plurality of lead strips extending along the peripheral edges of said members and overlying said bevel portions by about 50% of the width of said strips, said strips being adhesive backed to adhere to the overlaid bevel portions and to adjacent portions of said sheet which are not covered by said members;
   said panel being devoid of any build-up elements serving to space said lead strips from said backing sheet adjacent said beveled glass members.

2. The panel of claim 1 further comprising a second plurality of adhesive backed lead strips mounted on the side of said backing sheet remote from said members and located in positions corresponding to the positions of the lead strips of said first plurality.

3. The panel of claim 2 wherein said lead strips comprise an alloy of about 98% lead with the remainder being copper and antimony.

4. The panel of claim 1 wherein said lead strips are approximately ¼" in width and approximately ⅛" in thickness with a flat rear side.

5. The panel of claim wherein the backing sheet has a thickness in the range of 3/16" to ¼".

6. The panel of claim 5 wherein the thickness of the island portion and the thickness of the backing sheet are each 3/16".

7. The panel of claim 1 wherein the edge thickness of said beveled glass members is 1,6 millimeters.

8. The panel of claim 1 further including at least one film element mounted on said backing sheet adjacent at least one of said beveled glass members.

9. The panel of claim 8 wherein said film element is adhesive backed and is mounted by adhering to said backing sheet.

10. The panel of claim 9 wherein said film element is shaped to match the peripheral shape of adjacent beveled glass members and is overlaid by at least one of said lead strips in the region adjoining said members.

11. The panel of claim 10, wherein said film element is textured to provide a frosted effect.

12. The panel of claim 10 wherein said film element is colored and transparent to provide a stained glass effect.

13. A beveled glass panel simulating leaded glass comprising:
   a backing sheet of glass having at least one generally planar surface;
   a plurality of beveled glass members mounted in a predetermined pattern on said surface, each member having a generally planar rear face and a front face comprising a central island portion of 5 millimeters thickness surrounded by two or more bevel portions approximately one-half inch in width and extending to a peripheral edge having a thickness in a range of 1.5 to 2 millimeters;
   a layer of clear, ultra-violet radiation-sensitive adhesive positioned between said beveled glass members and said planar surface for adhering said members to said surface; and
   first and second pluralities of lead strips mounted on opposite sides of said panel, each lead strip being provided with a self adhering layer of adhesive along its rear face, said first plurality of lead strips being positioned so that approximately one-half of the width of said strips overlies the peripheral region of a corresponding beveled glass member, the remaining one-half of the width of said strips overlying the peripheral region of an adjacent beveled glass member or, if there is no beveled glass member adjacent thereto, overlying and adhering to the adjacent surface of said glass sheet;
   said second plurality of lead strips being located on the reverse side of said sheet in positions corresponding to the positions of the first plurality of said lead strips.

14. The method of fabricating a beveled glass panel simulating leaded glass comprising:
   selecting a generally planar glass backing sheet;
   selecting a plurality of beveled glass members, each having a central island portion approximately 5 to 6.35 millimeters thick which is surrounded by two or more bevel portions each extending from the island portion to a peripheral edge having a thickness not in excess of 2 millimeters, the width of each bevel portion being approximately one-half inch;
   applying a layer of clear ultra-violet radiation-sensitive adhesive to the back surface of each of said beveled glass members;
   positioning said beveled glass members on said backing sheet in positions to form a selected design pattern;
   exposing said adhesive to ultra-violet radiation for a time sufficient to cure said adhesive;
   positioning a first plurality of adhesive-backed lead strips on the upper side of said panel to extend along the peripheral edges of said beveled glass members and overlie the region of said bevel portions adjacent said edges by about one-half the width of said strips so that said strips adhere to said peripheral regions of adjacent beveled glass members, at least some of said lead strips being placed to overlie and adhere to regions of said backing sheet adjacent the edge of a beveled glass member; and
   burnishing said lead strips with a boning tool to conform said strips to the configuration of the panel underlying said strips.

15. The method of claim 1 further including the steps of applying a second plurality of lead strips to the reverse side of said backing sheet in positions corresponding to and opposite the positions of the lead strips of said first plurality.

16. The method of claim 15 further including the step of burnishing the lead strips of said second plurality to conform the strips to the configuration of the surface underlying said strips and to adhere said strips to said surface.

17. The method of claim 14 wherein the step of selecting a plurality of beveled glass members includes selecting said members having an edge thickness of 1.6 millimeters.

* * * * *